United States Patent [19]
Ernst et al.

[11] Patent Number: 5,227,414
[45] Date of Patent: Jul. 13, 1993

[54] AQUEOUS URETHANE-EPOXY COATING COMPOSITION

[75] Inventors: G. Dale Ernst, Minnetonka; Joseph S. Keute, Blaine; Alan R. Schuweiler, St. Paul, all of Minn.

[73] Assignee: Tennant Company, Minneapolis, Minn.

[21] Appl. No.: 876,059

[22] Filed: Apr. 29, 1992

[51] Int. Cl.$^5$ .............................................. C08L 63/02
[52] U.S. Cl. ................................. 523/417; 523/415; 523/420
[58] Field of Search ..................... 523/417, 420, 415

[56] References Cited

U.S. PATENT DOCUMENTS

| | | | |
|---|---|---|---|
| 4,190,567 | 2/1980 | Ohmura et al. | 525/426 |
| 4,427,804 | 1/1984 | Tortorello et al. | 523/404 |
| 4,489,179 | 12/1984 | Tortorello | 523/420 |
| 4,772,643 | 9/1988 | Ernst et al. | 523/414 |
| 4,861,825 | 8/1989 | Ernst et al. | 624/839 |
| 4,956,402 | 9/1990 | Perner et al. | 523/415 |

OTHER PUBLICATIONS

A. J. Tortorello et al., Air Force Technical Report AFWAL-TR-80 4197 (1981) at pp. 56-65; 97-105.

*Primary Examiner*—Melvyn I. Marquis
*Assistant Examiner*—David Aylward
*Attorney, Agent, or Firm*—Merchant, Gould, Smith, Edell, Welter & Schmidt

[57] ABSTRACT

An ambient temperature-curing aqueous urethane-epoxy emulsion coating composition is provided comprising an essentially organic solvent-free emulsion in water of:

(a) a urethane oligomer, terminated with primary amine functional groups which are reactive with epoxides, said oligomer being the reaction product of an isocyanate-terminated polyurethane prepolymer and a mono- or polyketimine compound containing one other functional group bearing a single active hydrogen atom which reacts with the isocyanate groups to yield a ketimine-terminated urethane oligomer, said ketimine-terminated urethane oligomer being emulsified into the water by conversion of the ketimine groups into primary amine groups and formation of acid salt of 25-50% of the amine groups by a volatile organic acid; and (b) a polyepoxide in an amount sufficient to provide a ratio of total primary amino group hydrogen atoms to epoxide groups of about 0.9 to 2.

16 Claims, No Drawings

AQUEOUS URETHANE-EPOXY COATING COMPOSITION

BACKGROUND OF THE INVENTION

Modified film-forming polyurethane compositions are widely employed as protective coatings for substrates in service conditions where rigorous film performance characteristics are required. Polyurethane coatings are known to have the advantages of high gloss, and can resist abrasion, water and many chemicals. When formulated optimally, they can display high flexibility, impact resistance and toughness.

In the past, organic solvent-borne, moisture cure urethanes or one- and two-part solution polyurethane coatings were the norm for these applications. Typical commercially available products of this type are Tennant #420 and Tennant #4700 (Tennant Co., Minneapolis, Minn.). Likewise, epoxy coating systems have been available in both organic solvents and water, which can provide some unique characteristics, such as high chemical resistance. Typical of a commercially available water-based epoxy coating system is Tennant #405.

A number of techniques have been developed for crosslinking polyurethanes by introducing free amino groups into the polyurethane and then reacting the amino groups with epoxide crosslinking agents, or "polyepoxides." The final products are aqueous film-forming emulsions which are useful to form highly adherent coatings on a wide variety of substrates, such as metal, concrete, glass and the like. However, the reactants, solvent systems and stoichiometry of the functional groups involved can be critical to the spectrum of properties which is observed in the final cross-linked or "cured" coating.

Generally, an isocyanate-terminated urethane oligomer or urethane "prepolymer resin," is first prepared by reacting a polyhydroxyl compound and an organic polyisocyanate, wherein said polyisocyanate is used in an amount in excess of the stoichiometric equivalent amount. The urethane oligomer is then terminated with protected primary amino groups by reaction of all or a part of the free isocyanate groups (NCO) on the prepolymer with a compound comprising a substituent having a free, NCO-reactive hydrogen atom, e.g., a secondary amino group ($R_2NH$). The compound also contains one or more primary amino groups that are blocked with a removable protecting group, such as a dialkylketone. The protecting group is then removed, and the amino-terminated urethane oligomer is cross-linked, in aqueous emulsion, by reaction of the free amino groups with the epoxy groups of a polyepoxide crosslinking agent.

More specifically, A. J. Tortorello et al. (U.S. Pat. Nos. 4,427,804 and 4,489,179) disclose forming an isocyanate-terminated prepolymer by reacting diphenylmethane diisocyanate with polytetraoxymethylene glycol, which is in turn reacted with diethylenetriamine, in which the primary amino groups ($NH_2$) were first protected by reaction with methyl isobutyl ketone (MIBK). The protected-primary amino group-containing prepolymer resin is then fully deprotected by dispersing in it aqueous acetic acid and then is reacted with a stoichiometric proportion of the diglycidyl ether of bisphenol A ("Epon 828"), to yield an epoxy cross-linked urethane coating composition. This methodology requires that the protecting agent is a highly hindered ketone.

H. Ohmura et al. (U.S. Pat. No. 4,190,567) discloses a curable, film-forming cationic polyurethane emulsion which is formed by mixing a neat polyepoxide cross-linking agent with an aqueous dispersion of an amine-terminated urethane prepolymer. The amino-terminated prepolymer is in turn formed by reacting the isocyanate-terminated prepolymer with diethylenetriame in methyl ethyl ketone (MEK). The epoxide is added to a "cationic polyurethane aqueous emulsion" formed by complete "neutralization" of the amine-terminated prepolymer with aqueous glycolic acid, residual MEK is stripped, and the product is diluted with water prior to use.

Commonly-assigned G. D. Ernst et al. (U.S. Pat. Nos. 4,816,825 and 4,772,643) disclose two-component aqueous urethane-epoxy systems that are substantially free of hazardous volatile organic solvents and free diisocyanate monomers, while retaining the desirable properties of a one-component, room temperature curable, solvent-borne coatings system. A typical system comprises, separately packaged, an aqueous dispersion of the polyepoxide component (e.g., Epon 828) and an aqueous dispersion of an amine-terminated urethane oligomer which has been dispersed in water with an amount of a volatile organic acid effective to neutralize only 25–40% of the amine groups, i.e., the amine groups are only partially "quaternized" or converted into the corresponding acid salt. An advantageous feature of this invention is the extended pot life of the finished product after the two aqueous components of the system are mixed at the application site, from no more than about 24 hours for prior systems, to as long as 3–4 days for the two-component aqueous emulsion system.

However, while exhibiting low toxicity and high stability, this composition is disadvantageous in that the components must be separately formulated, maintained, and then mixed together at some point by the end user. This can lead to increased packaging and storage costs, as well as to potential errors in formulation.

Therefore, a continuing need exists for improved ready-to-use urethane epoxy coating compositions.

SUMMARY OF THE INVENTION

The present invention provides an aqueous urethane-epoxy emulsion composition which is capable of curing at ambient temperature (about 20°–30° C.) to yield hard, coherent polymeric coatings having a high degree of resistance to abrasion, light and chemical degradation.

More specifically, the present composition comprises an organic solvent-free emulsion in water of:
(a) a urethane oligomer, terminated with primary amine functional groups which are reactive with epoxides, said oligomer being the reaction product of an isocyanate-functional polyurethane prepolymer and a mono or polyketimine compound containing one other functional group bearing a single active hydrogen atom which reacts with the isocyanate groups to yield a ketimine-terminated urethane oligomer, said ketimine-terminated urethane oligomer being emulsified into the water by conversion of the ketimine groups into primary amine groups and formation of an acid salt of 25–50% of the amine groups by a volatile organic acid; and
(b) an essentially organic solvent-free water-free polyepoxide in an amount sufficient to provide about 0.9 to about 2 total primary amino group hydrogen atoms per epoxy group.

Thus, the present urethane-epoxy emulsions is an aqueous system that is completely free of isocyanate functionality and which can be prepared so that it is essentially free of organic solvents, in that it contains less than about 5%, preferably less than about 1-2.5% of volatile organic solvents, such as ketones, polyepoxide solvents and the like. Preferably, the other functional group is a secondary amine.

The present emulsion coating composition can be prepared by a method comprising the steps of:
(a) reacting an isocyanate-functional polyurethane prepolymer with a mono or polyketimine compound containing one other functional group bearing a single active hydrogen atom to yield a ketimine-terminated urethane oligomer;
(b) dispersing the ketimine-terminated urethane oligomer in water comprising sufficient volatile organic acid to convert the ketimine groups into epoxide-reactive primary amine groups and ketone, and to form an acid salt of 25-50% of the amine groups;
(c) removing the ketone in vacuo; and
(d) dispersing an amount of an essentially organic solvent-free, water-free polyepoxide in the urethane oligomer dispersion, so that the ratio of primary amino group hydrogen atoms to epoxide groups is about 0.9 to about 2;
to yield an ambient temperature-curing, aqueous urethane-epoxy emulsion coating composition, which is essentially free of organic solvent.

The partial conversion of the deprotected primary amine groups, and any other available amine groups, on the urethane oligomer to the acid salt form, which is also referred to as "neutralization" or "quaternization" of tee total amine groups, assists in dispersing the solvent-free polyepoxide in the water. The polyepoxide need not be pre-emulsified in water as taught by the Ernst et al. patents discussed above, but may be added neat, or in combination with only minor amounts of volatile organic solvents ($\leq 5\%$).

It has been found that the properties of the ultimate urethane polymer coating system are influenced by the quantity of the solubilizing acid used to neutralize the urethane oligomer, or the percentage of amine functionality that is neutralized. It has been found that the ultimate ambient-cure properties (e.g., two weeks cure time at 20°-30° C., 40-60 percent relative humidity) of coatings utilizing completely neutralized amine functional urethane oligomers, and even systems with 60 percent neutralization, have important performance property deficiencies when compared to similar systems employing oligomers with about 40-50 percent of the amine function neutralized, e.g., which are 37.5-42.5 percent neutralized.

It might also be expected, however, that amine functional urethane oligomer dispersions with somewhat less than complete neutralization of amine functionality and, especially with somewhat less than 50 percent neutralization, would exhibit reduced shelf stability. Indeed, it has been found that lower neutralization can reduce shelf stability. When neutralization is below 20 percent, the resulting dispersion can have a disadvantageously high viscosity. Dispersions of oligomers neutralized from about 20 percent of stoichiometry to complete neutralization, however, exhibit essentially identical dispersed state characteristics of viscosity, translucency, and shelf life.

A unique feature of the invention is the extended potlife of the product after the partially neutralized urethane oligomer and the neat polyepoxide are mixed at the application site. Typically, urethane-epoxy coating systems exhibit limited pot life after combining the components. Generally, pot life has been associated with an increase in viscosity and has ranged from only a few minutes to several hours. When the viscosity has increased to the point where application becomes difficult, and adverse film appearance characteristics cannot be avoided, the effective pot life of the blend is considered to have been exceeded. Occasionally, when the rate of viscosity increase is slow, the pot life is determined by measuring physical properties of the cured coating applied at various intervals as pot age increases. A significant decline in physical properties indicates that pot life has been exceeded.

Generally, epoxy-urethane coating systems have pot lives of only a few hours and do not exceed 24 hours. In contrast, the rate of viscosity increase of the urethane-epoxy system of the present invention is extremely slow. The product typically exhibits good application characteristics as long as 3-4 days after blending the partially neutralized urethane oligomer and the polyepoxide. No difference in the physical properties has been detected between coatings applied ninety-six hours after blending to those applied initially.

To those versed in the technology of two-part solution epoxy ambient cure coating systems which comprise multifunctional primary amines, amido-amines, amine adducts, or polyamines, it is well established that stoichiometric blends of epoxy resins and active hydrogen atom bearing oligomers do not necessarily provide finished compositions with optimum coating properties. The ratio of 1,2-oxirane (epoxide) equivalency to active hydrogen equivalency can be varied widely (i.e., from 1:0.5 to 1:2 or higher), and the resultant coatings will exhibit a wide range of physical property differences. Infrared analysis has shown that a slight excess of active hydrogen equivalency (e.g.=0.9 equivalents of epoxide per active hydrogen atom) is required to obtain complete disappearance of absorbance due to the 1,2-oxirane group. Increasing the excess of amine active hydrogens above this "optimum" level provides increased flexibility and decreased hardness and brittleness to cured films. Nearly all other properties deteriorate; tensile strength drops rapidly while chemical and abrasion resistance are reduced.

It has been postulated that these property differences occur because molecular configurations in the cured polymeric coating vary according to the amount of the excess of active hydrogen atoms. At "optimum" blending ratios, the polymeric coating is nearly completely cross-linked, as each primary amine functional group is difunctional, and is thus capable of interacting with two epoxide groups. As the ratio of active hydrogen atoms is increased above optimum, however, in some cases only one of the two active hydrogen atoms will interact, so there will be a degree of linearity as well as a reduction in the cross-linking density in the cured polymeric coating. At a blending ratio of 1:2 (epoxide:active hydrogen atoms), it has been postulated that the cure is more linear than cross-linking in nature.

In the present invention, it has been found that the above differences in polymer configuration can be manipulated with advantage. It has been pointed out previously that urethane-type properties of this two component system are built into the original polyurethane prepolymer, and that larger prepolymer molecules with slight to moderate branching of essentially linear configurations are preferred.

Beyond this, however, it has been found that the polyurethane-like character of the cured coating can be enhanced by restricting the amount of polyepoxide "curing agent" somewhat, thereby promoting the extent of chain-extending reactions or linearity in the composite cured polymer. It has been found that the physical properties of the copolymer do not degrade as the active hydrogen atom-epoxide ratio exceeds stoichiometric or optimum, and the urethane-like properties of high abrasion resistance and gloss retention are generally improved at blending ratios of 1.25–1.75 active hydrogen equivalents per epoxide. In most cases the improvement continued on as the active hydrogen: epoxide ratio reaches 2:1.

It was also found, however, that the water resistance of the cured coating starts to decline as the active hydrogen atom:epoxide ratio approaches and exceeds 2:1. The water resistance of essentially linear urethane polymers with slight to moderate chain branching is normally very good, so in this sense, the result was not predictable. In two-part epoxy solution coatings technology, such as discussed in *General Guide: Formulating with Dow Epoxy Resins*, Dow Chemical Co. USA, Midland, Mich. (1988) at p. 28, water resistance properties of the cured coatings fall off steeply at higher hydrogen-epoxide ratios, and it has been postulated that this is due to the residual amino hydrogen atoms that render the film susceptible to water. If this postulation is valid, the same effect could be expected in the present urethane-epoxy copolymer system, as well. When blending ratios are within the range of 1.25–1.75 active hydrogen atoms per epoxide, however, water resistance properties typically are equal to those obtained on films where the blending ratio is essentially stoichiometric.

DETAILED DESCRIPTION OF THE INVENTION

Primary amines react with polyurethane prepolymers comprising free isocyanate groups (NCO), in crosslinking reactions. One primary amine reacts with two isocyanate groups to cause almost instant gellation. However, a molecule containing a primary amine functionality can be attached to an isocyanate-terminated polyurethane if it has one other functional group bearing one active hydrogen (e.g., secondary amino, hydroxyl, thiol, etc.). The primary amine functionality is first blocked by the condensation reaction of the primary amine and the carbonyl of a ketone to form a ketimine.

Monoprimary and/or polyfunctional primary amines that contain one other functional group bearing one active hydrogen atom, such as those of the formula:

are preferred, for formation of the present ketimine-terminated urethane oligomers, wherein m represents the integers 1 or 2, while concurrently, n represents the integers 1 or 0. $R_1$ represents the residue of a mono- or polyfunctional primary amine after removal of the primary amino nitrogen and the removal of the functional group bearing one active hydrogen atom (—XH). $R_1$ may be aliphatic, cycloaliphatic, heterocyclic, or aromatic and may be saturated or unsaturated. $R_1$ may be extensively branched and can bear one or more additional primary amine functional groups. Preferably, $R_1$ individually contains 2–8 carbon atoms; preferably, $R_1$ individually contains 2–4 carbon atoms, e.g., is $(C_2-C_8)$alkylene or $(C_2-C_8)$alkylidene. Preferred $R_1$ are ethylene, propylene and butylene.

$R_2$ may be aliphatic, cycloaliphatic, heterocyclic, or aromatic, and may be saturated or unsaturated. $R_2$ may also be attached to X, giving X a valence of 3 or 4, or it may be attached to $R_1$, giving X a valence of 2 or 3. $R_2$ may be a simple side chain for X or $R_1$, can connect X and $R_1$ to complete a cycloaliphatic structure, or it can itself be terminated with a primary amine functional group. When $R_2$ is terminated by a primary amine functional group, it may be identical to $R_1$, or it may be dissimilar. Preferably, $R_2$ contains 1–8 carbon atoms; preferably, $R_2$ contains 1–4 carbon atoms, e.g., is $(C_1-C_8)$alkylene, $(C_1-C_8)$alkyl or $(C_2-C_8)$alkylidene.

X represents a functional group bearing a single active hydrogen atom that is reactive with free isocyanate groups; preferably, X is nitrogen, oxygen or sulfur. The literature lists a number of additional functional groups with single active hydrogen attachment (e.g., carboxylic acids, halogen acids, etc.), that interact with isocyanates, but currently, these are not preferred due to instability and undesired side reactions or decomposition products. The functional group X and its single active hydrogen atom is therefore preferably a secondary amine, a hydroxyl (OH), or a thio (SH) group. The entire molecule represented by the above formula is either a monosecondary amino, monohydroxy, or monothio substituted, mono- or polyfunctional primary amine.

Examples of commercially available monosecondary amino, monoprimary amines are limited. Compounds of this type that have been found suitable for the purposes of this invention are N-(ω-aminoalkyl)-substituted diazacyloalkanes or alkenes such as N-(aminoethyl)piperazine and N-alkyl-1,ω-diaminoalkanes such as N-methyl-1,3-propanediamine. Examples of monosecondary amino, polyfunctional primary amines are likewise somewhat limited. Diethylene triamine, containing two primary amine groups and one secondary amine group, is presented as a well-known, commercially available example of this type of compound.

Examples of suitable monohydroxy, monoprimary amines are monoethanolamine, monoisopropanol amine, 3-amino-1-propanol, and the like. A suitable example of a monohydroxy, polyfunctional primary amine is 1,3-diamino-2-hydroxypropane.

Monothio-, mono- or polyfunctional primary amines can be prepared by the reaction of hydrogen sulfide or certain mercaptans with unsaturated monoamines such as alkyl amines, butenyl amine, cyclohexenyl amine, and the like. Examples of useful mercaptans for these syntheses include, among others, 1,3-propanedithiol, 1,4-butanedithiol, and 1,4-benzenedithiol.

Before the mono- or polyfunctional primary amines above can be used to terminate the free isocyanate functionality of an isocyanate functionalized prepolymer, however, the primary amine functional groups must first be blocked, or "protected" by reacting the primary amine functional groups with a removable protecting group such as a ketone. Ketones enter into a condensation reaction wherein the carbonyl of the ketone combines with the two active hydrogens of the primary amino group, forming water and a ketimine or polyketimine such as those of the formula:

$$H-X(R_1-N=C(R')(R''))_m(R_2)_{n'}$$

wherein $=C(R')(R'')$ is the residue remaining from a monoketone $(O=C(R')(R''))$ by the removal of the carbonyl oxygen, and wherein $R'$ and $R''$ radicals together contain about 2 to about 24 carbon atoms. $R'$ and $R''$ preferably are aliphatic. They may be identical in structure or may vary in size and/or configuration. Suitable examples of useful ketones include, among others, acetone, methylethyl ketone, diethyl ketone, methylisobutyl ketone, dibutyl ketone, diisobutyl ketone, methylisopropyl ketone, methyloctyl ketone, ethylbutyl ketone, dioctyl ketone, and the like. The ketimines or polyketimines may be prepared by methods disclosed in U.S. Pat. No. 3,291,775, and in Example 1(a), hereinbelow.

The resultant ketimine or polyketimine with a functional group bearing one active hydrogen atom is then added to an isocyanate functional prepolymer. In the subsequent addition reaction, an active hydrogen combines with an isocyanate group, yielding a ketimine (or polyketimine) terminated polyurethane oligomer, such as those of the formula:

$$R_3[NHCOX(R_1N=C(R')(R''))_m(R_2)_n]_p$$

wherein p represents a number ranging from 1.01–5, preferably 1.1–3, and wherein $R_3$ represents the residue remaining of an isocyanate functional prepolymer after removal of the free isocyanate functionality. Such prepolymers can be prepared, as is well known in the art, by combining an excess of one or more monomeric polyisocyanates, having at least two free isocyanate groups, with monomeric or polymeric compounds containing at least two active hydrogen atoms which are reactive with free isocyanate groups.

Representative monomeric polyisocyanates, while not being limited to these compounds, include; toluene diisocyanate, 4,4'-diphenyl diisocyanate, 4,4'-diphenylmethane diisocyanate, 4,4'diphenyl-ether diisocyanate, dianisidine diisocyanate, 1,5-naphthalene diisocyanate, p-phenylene diisocyanate, trimethylene diisocyanate, octadecylmethylene diisocyanate, 2-chloropropane diisocyanate, 4,4'-methylene-bis(phenyl isocyanate), isophorone diisocyanate, 1,6-hexamethylene diisocyanate, 4,4'-methylene-bis(cyclohexyl isocyanate), 4,4'4''-triphenyl-methane triisocyanate, 1,3,5-benzene triisocyanate, polymethylene poly(phenyl isocyanate), and/or di- or triisocyanate functional adducts of the above-mentioned monomers with polyhydroxyl monomers, such as the adduct of one mole of trimethylolpropane with 3 moles toluene diisocyanate or 3 moles of 4,4'-methylene-bis(cyclohexyl isocyanate).

The literature is replete with listings of suitable monomeric or polymeric compounds containing at least two active hydrogen atoms which are reactive with free isocyanate groups, including mercaptans, primary and secondary amines, acids, and hydroxyl-containing compounds. Hydroxyl-containing compounds are currently the materials of choice for the preparation of isocyanate-functional prepolymers for the purposes of this invention. Representative hydroxyl containing compounds include ethylene glycol, diethylene glycol, 1,3-propylene glycol, 1,4-butane diol, glycerol, trimethylolpropane, erythritol, pentaerythritol, polyethers, such as poly(ethylene oxide) diol, poly(ethylene oxide/-propylene oxide) diol, poly(propylene oxide) diol, and poly(tetramethylene oxide) diol; polylactones, such as polycaprolactone; and polyhydroxypolyesters of polycarboxylic acids, such as the esters of succinic acid, adipic acid, suberic acid, azelaic acid, sebacic acid, phthalic acid, isophthalic acid, and teraphthalic acid with polyols such as ethylene glycol, diethylene glycol, 1,4-butane diol, trimethylolpropane, glycerol, erythritol, pentaerythritol, poly(ethylene oxide) diol, poly(ethylene oxide/propylene oxide) diol, and poly(tetramethylene oxide) diol.

Preparation of the isocyanate functional polyurethane prepolymer can be accomplished by the conventional one-stage process, in which the reactants, including (a) at least one polyisocyanate having at least two isocyanate groups, (b) at least one organic compound having at least two active hydrogen functional sites, which compound preferably has at least two hydroxyls as the source of the active hydrogen atoms and preferably has a molecular weight in the range of 200 to 7500; and optionally, (c) at least one chain extending organic compound having two active hydrogen atoms or (d) a chain branching organic compound having at least three active hydrogen atoms, which preferably has a molecular weight below 300; are mixed and react together simultaneously, employing an isocyanate:active hydrogen (OH) ratio from 1.01:1 to 5:1, preferably 1.1:1 to 3:1.

Preparation of the polyurethane prepolymer may be carried out in the melt or in solution, that is, in the absence or presence of organic solvents which are inert with respect to isocyanate moieties. Preferred organic solvents for preparation of this isocyanate functional prepolymer in solution are those that are substantially soluble in water, or miscible with water, since the dispersion of the subsequently-formed ketimine terminated urethane oligomer into water can be facilitated by the organic solvent. Suitable organic solvents include, but are not limited to, methyl acetate, ethyl acetate, amyl acetate, acetone, methylethyl ketone, diethyl ketone, methylisobutyl ketone, dimethyl formamide, dioxane, and methyl pyrrolidone. Prepolymer preparation can be carried out under anhydrous conditions at a temperature of about 50°–80° C. range for several hours.

The addition reaction, to combine (a) a mono or polyketimine comprising a functional group bearing an active hydrogen atom and (b) an isocyanate functional prepolymer to yield (c) the ketimine-terminated urethane oligomer, should also be carried out under anhydrous conditions since ketimines are readily hydrolyzed and free isocyanates are reactive with water. The reaction conditions will vary according to the nature of the functional group bearing the active hydrogen atom on the ketimine. When the functional group is a secondary amine, the addition reaction with an isocyanate group links the ketimine and the polyurethane prepolymer through a substituted urea. This reaction occurs very rapidly, even at ambient temperature conditions (20°–30° C.). The reactants are combined using vigorous agitation. The reaction is accompanied by a substantial increase in viscosity. When the functional group bearing an active hydrogen atom is a hydroxyl, reaction time and temperature should be increased, since the rate of the isocyanate:hydroxyl reaction, linking the ketimine molecule to the prepolymer through a urethane linkage, is much slower than the isocyanate:secondary amine reaction rate. The isocyanate:thio reaction, linking a monothio, mono or polyketimine to an isocyanate functional prepolymer through a thiourethane linkage, occurs at a rate somewhat slower than the isocyanate:- hydroxyl rate and the reaction time in particular should be prolonged, and the reaction temperature should be increased to the 90°–100° C. range.

Once the urethane-ketimine oligomer is formed, it is usually not necessary to maintain the reaction product in anhydrous conditions. Hydrolysis of the ketimine may occur with exposure of the product to moisture, but the product is stable in either condition.

The ketimine-terminated urethane oligomer can be dispersed in water by neutralizing a portion of the amine functionality with a volatile organic acid. Once the oligomer is partially converted into the acid salt, the oligomer spontaneously disperses in water. Simultaneously, deprotection of the amine occurs, via hydrolysis of the ketimine structure. The ketone is regenerated, and the primary amine functionality is restored, as such, or as a primary amine salt, since a portion of the amino nitrogens have been neutralized with the volatile solubilizing acid to yield compounds of the formulae:

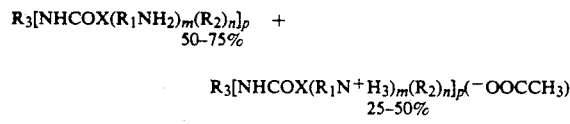

While acetic acid is typically used as the organic acid, the use of volatile solubilizing acids to disperse amino functionalized polymers is a well-known art, and any of a variety of acids may be used to neutralize the oligomer. Acetic acid is commonly used for this purpose and is preferred when the end product's intended use is that of a room temperature curing protective coating system. It is beneficial to select an acid that volatilizes readily from a thin liquid film of the applied product under ambient conditions.

A variety of neutralizing and dispersing techniques can be employed to disperse the oligomer. For example, concentrated (glacial) acetic acid may be added directly to the ketimine-terminated urethane oligomer solution (resulting in a significant viscosity increase). The viscous product may be slowly added to water with vigorous agitation, or water may be slowly added to the product with vigorous agitation.

The oligomer solution may be also neutralized with dilute acetic acid (e.g., 10 percent-50 percent acid by weight). The viscosity of the solution increases but not as severely as when concentrated acid is used. The acidified oligomer can then be added to water, or water can be added to the oligomer. The calculated weight of acid can be first added to water and the unneutralized oligomer can then be added to the acidified water, or acidified water can be added slowly to the unneutralized oligomer.

Vigorous agitation is essential for each of the above dispersion options, although somewhat less than high shear agitation is needed. A somewhat viscous colloidal dispersion of solvent swollen oligomer particles in water results. The partially acid-neutralized oligomer spontaneously disperses without the aid of a surfactant or emulsifying agent.

At this point, the dispersion or emulsion normally contains the organic solvents used to prepare the isocyanate functional polyurethane prepolymer, plus a quantity of regenerated ketone from the hydrolysis of ketimine. Therefore, the finished coating composition could pose serious toxicity and/or flammability concerns during application. In the interest of providing a coating system that minimizes these concerns, and one that meets current E.P.A. requirements for V.O.C., it is preferred that the volatile materials are removed. Another benefit from the removal of the organic processing solvents and the regenerated ketones is that the viscosity of the dispersion is reduced as solvents are removed, apparently from a reduction in oligomer particle size as solvent is extracted.

The choice of solvents used for prepolymer processing, and the choice of the ketone for the synthesis of the ketimine have a major impact on the success of the solvent removal step. For example, organic solvents, including the ketones, with boiling ranges considerably higher than that of water, may be difficult to evaporate in vacuo.

The epoxy resins useful in the present invention are well known and are prepared by known techniques or can be obtained commercially. They are compounds or mixtures of compounds containing at least one, but typically more than one, 1,2-epoxy group of the formula:

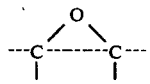

These epoxy resins may be saturated or unsaturated, aliphatic, cycloaliphatic, aromatic, or heterocyclic. Examples of suitable epoxy resins include, but are not limited to, polyepoxides, such as the polyglycidyl ethers of polyphenols and/or polyepoxides containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include: 1,1-bis(4-hydroxyphenyl)ethane, 2,2-bis(4-hydroxyphenyl)propane, 1,1-bis(4-hydroxyphenyl)isobutane, 2,2-bis(4-hydroxy-t-butylphenyl)propane, bis(2-hydroxy-1,5-dihydroxynaphthalene, 1,1-bis(4-hydroxy-3-allyphenyl)ethane, and hydrogenated derivatives thereof. The polyglycidyl ethers of polyphenols of various molecular weights may be produced, for example, by varying the mole ratio of epichlorohydrin to polyphenol in known manner.

Useful polyepoxides also include the polyglycidyl ethers of mononuclear polyhydric phenols such as the polyglycidyl ethers of resorcinol, pyrogallol, hydroquinone, and pyrocatechol. Epoxy resins also include the polyglycidyl ethers of polyhydric alcohols such as the reaction products of epchlorohydrin or dichlorohydrin with ($C_2$–$C_{20}$) aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2-hexanetriol, pentaerythritol, and 2,2-bis(4-hydroxycyclohexyl)propane.

Epoxy resins also include the aliphatic, cycloaliphatic, and glycidyl ether type 1,2-epoxides such as propylene oxide, styrene oxide, vinylcyclohexene dioxide, glycidol, butadiene oxide, glycidyl propionate, 3,4-epoxycyclohexylmethyl 3,4-epoxycyclohexanecarboxylate, 3,4-epoxy-6-methylcyclohexanecarboxylate, bis(3,4-epoxy-6-methylcyclohexylmethyl)adipate, dipentene oxide, and poly(dimethylsiloxanes) having cycloaliphatic epoxide or glycidyl ether groups.

Polyepoxides additionally include polyglycidyl esters of polycarboxylic acids such as the generally known polyglycidyl esters of bis(carboxylic acids) such as adipic acid, phthalic acid, and the like. In addition, polymerized resins containing epoxy groups may also be employed. These polyepoxides may be produced by the addition polymerization of epoxy functional monomers such as glycidyl acrylate, glycidyl methacrylate, and allyl glycidyl ether, optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, and isobornyl methacrylate. Many additional examples of useful epoxy resins are described in the *Handbook of Epoxy Resins*, H. Lee et al. eds, McGraw Hill Book Company (1967).

An evaluation of the polyurethane coatings derived from the present aqueous urethane-epoxy emulsion coating compositions was conducted to determine if the coatings could meet the objectives of providing properties similar to those of high performance type polyurethane solution coatings such as organic solvent-borne moisture cure urethanes. The considerations involved in test method selection, and a description of test methods used is as follows.

Perhaps the predominant performance feature of polyurethane coatings which sets them apart from other industrial/architectural coatings is their "toughness." The *Paint/Coatings Dictionary*, published by the Federation of Societies for Coatings Technology, 1978, defines toughness as "that property of a material by virtue of which it can absorb work." Brittle is defined in the same volume as ". . . the opposite of tough." Possibly a measure of the resiliency of a protective coating film would be a good measure of its toughness. Unfortunately, this parameter is difficult to measure in films whose thickness ranges from 5–80 microns (0.2–3.15 mils). Abrasion resistance is a commonly measured property in the protective coatings industry and is closely related to toughness, as it measures the work-absorbing capacity of a coating.

A variety of techniques to evaluate the abrasion resistance of protective coatings are published by ASTM. Method D-4060-81, "Abrasion Resistance of Organic Coatings by the Taber Abraser," is perhaps the most widely used. Abrasion resistance determined by this test is reported in terms of milligrams of coating loss per 1000 cycles of wear. Generally, the lower the number of mg lost, the greater the ability of the protective coating to resist abrasion. However, it should be noted that coatings that are very soft and extensible, but yet resilient, can provide the lowest abrasion resistance values, yet are often too soft to be useful as protective coatings.

Thus, depending on the overall performance requirements of the coating system, the lowest abrasion resistance values often do not reflect optimal performance.

A urethane coating product intended for use as an industrial concrete floor coating must have sufficient tensile or cohesive strength to resist scratching, and sufficient hardness to resist dirt collection from industrial traffic. The abrasion value for (Tennant #420), a commercially available aromatic moisture case urethane coating product of this type is from 25-30 mg./1000 cycles. A commercial two-part amine crosslinked water epoxy, available as #405 from Tennant Co., also used in the study as a control, is formulated for pedestrian traffic. It is somewhat harder and less extensible than the moisture cure product; its Taber abrasion value is about 120. For comparison, a chemically resistant two-part aliphatic urethane solution coating available from Tennant Co. as #4700, is also included as a control. It has a Taber abrasion value in the 50–60 range.

Film hardness in our study has been evaluated in accord with ASTM method D-4366-84, "Hardness of Organic Coatings by Pendulum Damping Tests". It describes the König hardness tester and is preferred over other hardness tests, since coating surface imperfections have little influence on the hardness reading. König hardness is defined (ASTM) as "time in seconds for the swing amplitude of the König pendulum to decrease from 6° to 3°". The unit is calibrated on plate glass, yielding a value of 250±10 seconds. For comparison, on harder coatings, the König value approximates 2.5 times the Sward value (another common hardness test); on softer coatings, the difference is slightly less.

The water resistance of the experimental and control coatings of this study was evaluated by depositing puddles of distilled water on the surface of coatings applied and cured on glass under standard conditions of 73° F. (22.7° C.), 50±5 percent relative humidity for two weeks. The effect of exposure to water was evaluated immediately after removal of water, and again after a one-hour recovery period. Evaluations were made after water exposures of 1 hour, 4 hours, and 24 hours duration. In all cases, evaluations included the performance of the control coatings, including Tennant #420, the control moisture cure urethane mentioned above. Water resistance performance ratings of the experimental coatings were based on comparisons with the control.

The following examples set forth the sequential steps for preparing the coatings, and the results obtained from the above testing regimen. They illustrate, but do not intend to limit the scope of the invention. All parts and percentages are by weight unless otherwise specified.

EXAMPLE 1

Formation of the Ketimine

The condensation product obtained by reacting N-(aminoethyl)piperazine and methylethyl ketone (MEK) results in release of water and formation of a ketimine. The primary amine is thus "blocked" from reacting with isocyanates. Suitable amines may be mono(primary) functional or multifunctional. Any non-cyclic ketone can be used to form the ketimine, but methylethyl ketone (MEK), and methylisobutyl ketone (MIBK) are preferred due to practical considerations.

EXAMPLE 1(a)

In a typical preparation, a gram mol of N-(aminoethyl) piperazine (AEP,129 g), is combined with 1.1 gram mol of MEK (79.2 g) in a nitrogen blanketed reaction flask along with approximately 200 g of cyclohexane. The mixture is heated to reflux temperature (80°-85° C.) and is refluxed until the stoichiometric quantity (18 g) of water has been collected in a Dean-Stark trap. Cyclohexane and excess MEK are then removed from the ketimine product in a rotary evaporator. Infrared spectra of the ketimine are obtained to ensure the development of absorption due to C=N formation (1660 cm$^{-1}$), and the disappearance of absorption due to NH$_2$ at around 1600 cm$^{-1}$. The amine equivalent weight of the product is determined to be 195.

EXAMPLE 1(b)

A gram mol of diethylene triamine (DETA, 103 g) is combined with 2.2 mol of methylisobutyl ketone MIBK (220 g), and 300 g cyclohexane, using the procedure of Example 1(a). After removal of the stoichiometric condensed water (36 g), the reflux solvent and excess MIBK are removed. The equivalent weight of the ketimine product is determined to be 273.

EXAMPLE 2

Preparation of the Polyurethane Prepolymer

The isocyanate-functional polyurethane prepolymer can be prepared from a wide variety of polyols and diisocyanate monomers. The following procedure is representative:

EXAMPLE 2(a)

170.3 g of polytetramethylene glycol, hydroxyl number (OH#)-112 (0.333 equivalents of hydroxyl), 22.33 g of trimethylolpropane (TMP, 0.5 equivalents of hydroxyl), and 129.5 g of isophorone diisocyanate (IPDI, 1.167 equivalents of isocyanate) are combined in a one liter glass reaction flask under a nitrogen atmosphere. A reaction temperature of 65°±2° C. is maintained by incremental addition of 272 g of dry MEK (<0.05 percent water). After eight hours, the isocyanate content is 2.36 percent (theoretical, 2.36 percent). Nonvolatile content (N.V.) is 54 percent, Brookfield viscosity is 150 centipoise. The free isocyanate (NCO) equivalent weight of the prepolymer is 965, solids basis, and 1780, solution basis. This polyurethane prepolymer product is referred to as Prepolymer A.

EXAMPLE 2(b)

The following prepolymers were prepared by the procedure described in Example 2(a):

EXAMPLE 3

Formation of the Ketimine Blocked Urethane Oligomer

The ketimine is reacted at its secondary amine site with the reactive terminal isocyanate group of the polyurethane prepolymer resulting in formation of a urethane oligomer terminated by a ketimine. Thus, the terminal isocyanate group reacts with the secondary amine as it is prevented from reacting with the primary amine due to the ketimine-protecting group.

EXAMPLE 3(a)

30.0 g of the diethylene triamine bis(ketimine) of Example 1(b) is combined with 200 g of urethane prepolymer A of Example 2(a) in a two liter glass reaction flask under a nitrogen atmosphere with vigorous agitation at a temperature of 40° C. After 20 minutes, an infrared scan indicated a complete reaction by the disappearance of absorption due to unreacted NCO at 2250 $cm^{-1}$. The resultant ketimine-terminated urethane oligomer was uniform in appearance and a light straw color.

EXAMPLE 4

Neutralizing and Hydrolyzing the Ketimine-Terminated Urethane Oligomer to Form an Amine-Terminated Urethane Oligomer—(Component B)

The ketimine-terminated urethane oligomer is combined sequentially with a volatile organic acid and with water to partially hydrolyze it and to render it water dispersible. Optionally, a volatile organic cosolvent is combined with the organic acid, as needed to adjust viscosity. Hydrolysis of the ketimine, restores the primary amine functionality and regenerates the ketone, which is subsequently removed in vacuo along with other organic solvents used in the previous reactions. The primary amine functionality is then reacted with the polyepoxide component, e.g., at the work site or other place of use.

The following example of neutralization and hydrolysis is described with the understanding that some o the terminal amines of the urethane oligomer are present as the cationic ammonium acetate salt.

TABLE 1

| Polyurethane Prepolymer ID | Type of Polyol (g) | | TMP g | Type of Isocyanate (g) | | NCO Equivalent Weight of Prepolymer |
|---|---|---|---|---|---|---|
| Prepoly A | PTMG II | (170.3) | 22.33 | IPDI | (129.5) | 965 |
| Prepoly B | Cap | (81.9) | 0.00 | Isocyan I | (139.3) | 1100 |
| Prepoly C | PNPA I + | (167.5) | 178.64 | IPDI | (971.3) | 1820 |
|  | PNPA II | (789.9) |  | MDI | (126.6) | 1870 |
| Prepoly D | PNPA I | (93.1) | 11.17 | TDI | (304.5) | 1890 |
| Prepoly E | PTMG II | (505) | 66.99 | IPDI | (388.5) | 1930 |
| Prepoly F | PTMG I | (318) | 66.99 | IPDI | (194.3) | 2440 |
| Prepoly G | Cap | (235.5) | 31.26 | $H_{12}$MDI | (102.7) | 3400 |
| Prepoly H | PNPA II | (122.5) | 13.89 | Isocyan II + | (79.3) | 4510 |
| Prepoly I | PNPA II | (179.0) | 0.00 | IPDI | (15.9) |  |
| Prepoly J | PNPA II + | (138.4) | 6.70 | IPDI | (97.1) | 5150 |
|  | PU | (56.1) |  |  |  |  |

Cap = Polycaprolactone diol, OH# = 143
PNPA I = Poly(neopentyl adipate) diol, OH# = 225
PNPA II = Poly(neopentyl adipate) diol, OH# = 112
PTMG I = Polytetramethylene glycol, OH# = 173
PTMG II = Polytetramethylene glycol, OH# = 112
PU = Polyurethane diol, OH# = 320
IPDI = Isophorone diisocyanate
Isocyan I = Isocyanurate of 1,6-hexamethylene diisocyanate
Isocyan II = Isocyanurate of Isophorone diisocyanate
MDI = 4,4'-Bis(isocyanatophenyl)methane
TDI = Toluene diisocyanate
$H_{12}$MDI = Bis-(4-isocyanatocyclohexyl)methane

EXAMPLE 4(a)

Glacial acetic acid is added to the ketimine-terminated urethane oligomer of Example 3(a) with vigorous agitation, resulting in a significant solution viscosity increase. 234 g of MEK is added to reduce viscosity and after thorough blending, the acidified product is slowly added to 274 g distilled water, using vigorous low shear agitation. A colloidal dispersion of the solvent-swollen amino-terminated urethane oligomer in water results (N.V.—16.0 percent, Brookfield viscosity—165 cps). As MEK is stripped from the dispersion in a laboratory rotary evaporator, the viscosity gradually drops. When 324 g MEK plus approximately 5 g water has been collected, and when the distillate appears to be composed entirely of water, the stripping is discontinued. The final product is herein referred to as Oligomer Dispersion A and its characteristics are: Percent nonvolatiles (N.V. %)=30.0; Viscosity=140 cps (Brookfield); pH=7.40; Appearance=Slightly amber translucent; Organic Solvent Content=0.85%, as determined via gas chromatographic (G.C.) analysis; Percent amine quaternization=45%.

EXAMPLE 4(b)

Table 2 summarizes the primary amine-terminated urethane oligomer dispersions prepared in accord with Example 3(a) and Example 4(a). Each prepolymer (Table 1-B through J) was terminated with ketimine, partially neutralized and dispersed to yield the corresponding oligomer dispersion (B through J), as Prepolymer A was converted to Oligomer Dispersion A in Example 4(a).

TABLE 3

| EPOXY RESIN IDENTIFICATION | | |
|---|---|---|
| ID | Equivalent Weight | Name |
| L | 130 | Diglycidyl ether of Resorcinol |
| M | 132 | Diglycidyl ether of Hydantoin |
| N | 135 | Triglycidyl ether of trimethylolpropane |
| O | 135 | Epoxy cyclohexyl methyl epoxy cyclohexane carboxylate |
| P | 135 | Diglycidyl ether of neopentyl glycol |
| Q | 166 | Diglycidyl ether of Bisphenol F |
| R | 170 | Diglycidyl ether of hexahydrophthalic acid |
| S | 185 | Glycidyl ether of Creosol |
| T | 190 | Diglycidyl ether of tetrapropylene glycol |
| U | 190 | Diglycidyl ether of Bisphenol A |
| V | 290 | $C_{12}$-$C_{14}$ Alkyl Glycidyl Ether |

Each of the oligomer dispersions of Example 4(b) were mixed with one or more of the polyepoxides of Table 3. A 3 mil (wet) film was drawn down on glass for evaluation of dry film properties. Film hardness was measured by König pendulum method at intervals of 24 hours and two weeks while curing at standard conditions of 73°±2° F., 50±5 percent relative humidity. Taber abrasion test and water resistance were initiated upon completion of the two-week cure period.

Water resistance rating was based on 24-hour water exposure and a comparison with the resistance of a control film. One hour after removal of the water, a rating of zero (0) indicates no detectible effect on the film. A rating of one (1), indicates complete film recovery, but the film will mark or scratch. A rating of two (2) indicates complete film recovery, but the film will mark or scratch and also scrape off. A rating of three (3) indicates complete recovery of film hardness, but bubbles remain under the film and the film will lift off with some difficulty. A rating of four (4) indicates film did not recover original hardness and lifts off the glass easily.

TABLE 2

TABLE OF OLIGOMER DISPERSIONS

| Oligomer | | | | Oligomer Dispersion | | | | |
|---|---|---|---|---|---|---|---|---|
| Prepolymer (g) | Ketimine (g) | Acetic Acid (g) | Water (g) | | % NV* | Visc. cps | Amine eq. wt. | Percent Neutralization of $NH_2$ |
| A (200) | 23.7** | 4.70 | 274.0 | A | 30.0 | 150 | 915 | 45 |
| B (150) | 33.8 | 7.46 | 253.9 | B | 30.0 | 50 | 1105 | 34 |
| C (200) | 26.7 | 5.87 | 329.6 | C | 30.0 | 160 | 1825 | 33 |
| D (200) | 24.9 | 6.59 | 316.0 | D | 30.0 | — | 1870 | 41 |
| E (200) | 29.6 | 6.53 | 370.0 | E | 29.5 | 35 | 1830 | 34 |
| F (600) | 72.3 | 16.59 | 956.8 | F | 28.7 | 165 | 2440 | 35 |
| G (200) | 19.2 | 4.22 | 316.8 | G | 30.0 | 525 | 1935 | 33 |
| H (200) | 16.7 | 5.16 | 320.0 | H | 25.6 | 300 | 3405 | 47 |
| I (200) | 7.7 | 2.03 | 280.8 | I | 25.0 | 165 | 4115 | 40 |
| J (200) | 6.8 | 1.98 | 278.0 | J | 27.9 | 15 | 5165 | 45 |

*% Nonvolatile after removing MEK
**A is DETA terminated by using the ketimine in Example 1(b). B through J are AEP terminated by using the ketimine in Example 1(a).

EXAMPLES 5-81

Reaction of Oligomer Dispersions with Epoxy Resins

The epoxy resins (component A) listed below in Table 3 are reacted with the oligomer dispersions of Table 2 in the examples that follow.

A commercial moisture cure urethane coating product (TENNANT #420 Urethane Finish) and a commercial aqueous two-part epoxy floor sealer (TENNANT #405 Water Epoxy), were included as controls in each test run. Results of these tests are tabulated below.

The following examples, 5-81, are presented to demonstrate the wide variety of hardness, abrasion resistance and water resistance exhibited by the present compositions. One can modify the crosslink density of the oligomer dispersion and/or alter the functionality and/or equivalent weight of the epoxy by changing epoxy resins in order to vary the "urethane" character of the composition.

EXAMPLE 5

33.98 g (0.037 eq. NH) of the Oligomer Dispersion A was blended with 3.71 g (0.029 eq. epoxy) of epoxy resin L (the diglycidyl ether of resorcinol) at ambient conditions in a small (50 ml) disposable cup and stirred for about 5 minutes. A 3 mil film cured on glass exhibited a König hardness of 48 after 24 hr and of 153 after 2 weeks; a Taber abrasion of 57 and a water resistance rating of 1.

EXAMPLES 6-12

Table 4 lists the results of evaluations of seven other films prepared in accord with Example 5, using 33.98 g of oligomer dispersion A and the amount of epoxy resin indicated (0.029 eq. epoxy).

TABLE 4

| Example No. | Epoxy Resin (g) | | König 24 hr | König 2 wks | Taber Abrasion | 24 hr $H_2O$ Resistance |
|---|---|---|---|---|---|---|
| 6 | M | (3.83) | 84 | 156 | 76 | 1 |
| 7 | N | (3.92) | 25 | 113 | 58 | 1 |
| 8 | O | (3.92) | 16 | 36 | — | 0 |
| 9 | P | (3.92) | 24 | 85 | 48 | 2 |
| 10 | Q | (4.81) | 28 | 67 | 68 | 0 |
| 11 | R | (4.93) | 29 | 98 | — | 0 |
| 12 | T | (5.51) | 20 | 30 | — | 4 |
| TENNANT #420 Urethane Finish | | | 90 | 120 | 25-30 | 0 |
| TENNANT #405 Water Epoxy | | | 50 | 110 | 120 | 0 |

As can be seen from the data summarized on Table 4, the combination of oligmer dispersion with di- and triglycidyl ethers (L-N) yielded films with König hardnesses which were superior to Tennant 405 in at least one test and which were more resistant to abrasion. The water resistance of all of the cured films was satisfactory, except for the film which was formed using the hydrophilic epoxy resin T.

EXAMPLE 13

Prepolymer B was prepared as described in Example 2(a) using Isocyan I (Coronate EH) (1.75 eq. NCO), and Cap (polycaprolactone diol) (0.5 eq. OH). No TMP was used. It was terminated with AEP ketimine from Example 1(a) in accord with Example 3(a) and then neutralized and dispersed as in Example 4(a). 35.91 g (0.0325 eq NH) of this oligomer dispersion B was then mixed with 3.38 g (0.025 eq. epoxy) of epoxy resin N as described in Example 5. The film has a König hardness of 13 (24 hr) and 52 (2 week), and a water resistance of 4.

EXAMPLES 14-23

Prepolymer C was prepared as described in Example 2(a) using IPDI (1.75 eq. NCO), TMP (0.8 eq. OH), and PNPA I (Witco Formrez 55-225) with PNPA II (Witco Formrez 55-112) to an equivalent weight of 425 (0.45 eq. OH). It was terminated with AEP ketimine from Example 1(a) in accord with Example 3(a) and then neutralized and dispersed as in Example 4(a). Table 5 lists the results of evaluations of ten films prepared in accord with Example 5, using 33.85 g (0.0183 eq. NH) of this Oligomer Dispersion C and the amount of epoxy resin indicated (0.0143 eq. epoxy).

TABLE 5

| Example No. | Epoxy Resin (g) | | König 24 hr | König 2 wks | Taber Abrasion | 24 hr $H_2O$ Resistance |
|---|---|---|---|---|---|---|
| 14 | L | (1.86) | 83 | 169 | 87 | 0 |
| 15 | M | (1.89) | 128 | 170 | 106 | 2 |
| 16 | N | (1.93) | 69 | 147 | 61 | 0 |
| 17 | O | (1.93) | 98 | 123 | 139 | 4 |
| 18 | P | (1.93) | 90 | 155 | 77 | 1 |
| 19 | Q | (2.37) | 83 | 80 | 123 | 0 |
| 20 | R | (2.43) | 84 | 148 | 95 | 1 |
| 21 | S | (2.65) | 73 | 136 | 158 | 4 |
| 22 | T | (2.72) | 40 | 116 | 68 | 1 |
| 23 | V | (4.15) | 25 | 32 | — | 0 |

EXAMPLES 24-30

Prepolymer D was prepared as described in Example 2(a) using MDI (Isonate 125M) (1.75 eq. NCO), TMP (0.5 eq. OH), and PNPA I (Witco Formrez 55-225) (0.75 OH eq). It was terminated in accord with Example 3 and then neutralized and dispersed as in Example 4(a). Table 6 lists the results of evaluations of seven films prepared in accord with Example 5, using 34.91 g (0.0183 eq. NH) of this Oligomer Dispersion D and the amount of epoxy indicated (0.0143 eq. epoxy).

TABLE 6

| Example No. | Epoxy Resin (g) | | König 24 hr | König 2 wks | Taber Abrasion | 24 hr $H_2O$ Resistance |
|---|---|---|---|---|---|---|
| 24 | L | (1.86) | 155 | 190 | 46 | 0 |
| 25 | M | (1.89) | 131 | 178 | 135 | 2 |
| 26 | N | (1.93) | 87 | 162 | 137 | 2 |
| 27 | O | (1.93) | 102 | 136 | — | 2 |
| 28 | P | (1.93) | 74 | 151 | 99 | 3 |
| 29 | S | (2.65) | 51 | 133 | 162 | 2 |
| 30 | T | (2.72) | 52 | 123 | 74 | 2 |

EXAMPLES 31-37

Prepolymer E was prepared as described in Example 2(a) using TDI (1.75 eq. NCO), TMP (0.75 eq. OH), and PTMG II (Polymeg 1000) (0.5 eq. OH). It was terminated with AEP ketimine of Example 1(a) in accord with Example 3 and then neutralized and dispersed as in Example 4(a). Table 7 lists the results of evaluations of seven films prepared in accord with Example 5, using 33.95 g (0.0183 eq. NH) of this Oligomer Dispersion E and the amount of epoxy indicated (0.0143 eq. epoxy).

TABLE 7

| Example No. | Epoxy Resin (g) | | König 24 hr | König 2 wks | Taber Abrasion | 24 hr $H_2O$ Resistance |
|---|---|---|---|---|---|---|
| 31 | M | (1.89) | 54 | 98 | 44 | 3 |
| 32 | N | (1.93) | 25 | 113 | 58 | 1 |
| 33 | O | (1.93) | 25 | 46 | — | 1 |
| 34 | P | (1.93) | 32 | 63 | 32 | 2 |
| 35 | R | (2.43) | 32 | 63 | 32 | 2 |
| 36 | S | (2.65) | 22 | 34 | — | 2 |
| 37 | T | (2.72) | 17 | 43 | — | 1 |

EXAMPLES 38-48

Prepolymer F was prepared as described in Example 2(a) using IPDI (1.75 eq. NCO), TMP (0.75 eq. OH), and PTMG I (Polymeg 650) (0.5 eq. OH). It was terminated with AEP ketimine of Example 1(a) in accord with Example 3(a) and then neutralized and dispersed as in Example 4(a). Table 8 lists the results of evaluations of eleven films prepared in accord with Example 5, using 35.23 g (0.0144 eq. NH) of this Oligomer Dispersion F and the amount of epoxy indicated (0.0111 eq. epoxy).

TABLE 8

| Example No. | Epoxy Resin (g) | König 24 hr | König 2 wks | Taber Abrasion | 24 hr H₂O Resistance |
|---|---|---|---|---|---|
| 38 | L (1.44) | 97 | 177 | 60 | 0 |
| 39 | M (1.47) | 119 | 179 | 78 | 2 |
| 40 | N (1.50) | 71 | 146 | 66 | 1 |
| 41 | O (1.50) | 57 | 102 | 119 | 2 |
| 42 | P (1.50) | 77 | 156 | 77 | 1 |
| 43 | Q (1.84) | 95 | 138 | 91 | 1 |
| 44 | R (1.89) | 70 | 158 | 70 | 0 |
| 45 | S (2.05) | 62 | 108 | 131 | 4 |
| 46 | T (2.11) | 29 | 102 | 58 | 3 |
| 47 | U (2.11) | 94 | 116 | 112 | 2 |
| 48 | V (3.22) | 20 | 22 | — | 0 |

EXAMPLES 49-57

Prepolymer G was prepared as described in Example 2(a) using IPDI (1.75 eq. NCO), TMP (0.7 eq. OH), and Cap (Tone 210 polycaprolactone polyol) 425 eq. wt. (0.55 eq. OH). It was terminated with AEP ketimine of Example 1(a) in accord with Example 3(a) and then neutralized and dispersed as in Example 4(a). Table 9 lists the results of evaluations of nine films prepared in accord with Example 5, using 35.92 g (0.0186 eq. NH) of this Oligomer Dispersion G and the amount of epoxy indicated (0.0143 eq. epoxy).

TABLE 9

| Example No. | Epoxy Resin (g) | König 24 hr | König 2 wks | Taber Abrasion | 24 hr H₂O Resistance |
|---|---|---|---|---|---|
| 49 | L (1.86) | 35 | 102 | 45 | 1 |
| 50 | M (1.89) | 36 | 115 | 52 | 3 |
| 51 | N (1.93) | 17 | 62 | 21 | 2 |
| 52 | O (1.93) | 31 | 40 | — | 1 |
| 53 | P (1.93) | 31 | 68 | 36 | 1 |
| 54 | R (2.43) | 27 | 80 | 53 | 1 |
| 55 | S (2.65) | 26 | 44 | — | 1 |
| 56 | T (2.72) | 13 | 39 | — | 4 |
| 57 | U (2.72) | 17 | 18 | — | 0 |

EXAMPLES 58-63

Prepolymer H was prepared as described in Example 2(a) using H₁₂MDI (Desmodur W) (1.75 eq. NCO), TMP (0.7 eq. OH), and PNPA II (Witco Formrez 55-112) (0.55 eq). It was terminated with AEP ketimine of Example 1(a) in accord with Example 3(a) and then neutralized and dispersed as in Example 4(a). Table 10 lists the results of evaluations of nine films prepared in accord with Example 5, using 40.24 g (0.0118 eq. NH) of this Oligomer Dispersion H and the amount of epoxy indicated (0.0091 eq. epoxy).

TABLE 10

| Example No. | Epoxy Resin (g) | König 24 hr | König 2 wks | Taber Abrasion | 24 hr H₂O Resistance |
|---|---|---|---|---|---|
| 58 | L (1.18) | 55 | 139 | 40 | 2 |
| 59 | N (1.23) | 41 | 134 | 30 | 3 |
| 60 | Q (1.51) | 53 | 82 | 114 | 1 |
| 61 | R (1.55) | 43 | 123 | 61 | 3 |
| 62 | S (1.68) | 48 | 84 | 116 | 1 |
| 63 | V (2.64) | 16 | 21 | — | 0 |

EXAMPLES 64-72

Prepolymer I was prepared as described in Example 2(a) using Isocyan II (Hüls T-1890) (1.25 eq. NCO), IPDI (0.5 eq. NCO), no TMP, and PNPA II (Witco Formrez 55-112) (1.25 eq. OH). It was terminated with AEP ketimine of Example 1(a) in accord with Example 3(a) and then neutralized and dispersed as in Example 4(a). Table 11 lists the results of evaluations of nine films prepared in accord with Example 5, using 38.21 g (0.0093 eq. NH) of this Oligomer Dispersion I and the amount of epoxy indicated (0.0071 eq. epoxy).

TABLE 11

| Example No. | Epoxy Resin (g) | König 24 hr | König 2 wks | Taber Abrasion | 24 hr H₂O Resistance |
|---|---|---|---|---|---|
| 64 | L (0.93) | 14 | 45 | — | 0 |
| 65 | M (0.94) | 27 | 60 | 77 | 0 |
| 66 | N (0.96) | 11 | 51 | 56 | 2 |
| 67 | O (0.96) | 13 | 32 | — | 2 |
| 68 | P (0.96) | 14 | 35 | — | 0 |
| 69 | Q (1.18) | 15 | 29 | — | 0 |
| 70 | R (1.21) | 22 | 42 | — | 1 |
| 71 | S (1.31) | 10 | 26 | — | 2 |
| 72 | T (1.35) | 9 | 29 | — | 1 |

EXAMPLES 73-81

Prepolymer J was prepared as described in Example 2(a) using IPDI (1.75 eq. NCO), TMP (0.3 eq. OH), PU polyol (K-Flex 320-100) (0.7 eq. OH) and PNPA II (Witco Formrez 55-112) (0.55 eq. OH). It was terminated with AEP ketimine of Example 1(a) in accord with Example 3(a) and then neutralized and dispersed as in Example 4(a). Table 12 lists the results of evaluations of nine films prepared in accord with Example 5, using 38.37 g (0.0074 eq. NH) of this Oligomer Dispersion J and the amount of epoxy indicated (0.0057 eq. epoxy).

TABLE 12

| Example No. | Epoxy Resin (g) | König 24 hr | König 2 wks | Taber Abrasion | 24 hr H₂O Resistance |
|---|---|---|---|---|---|
| 73 | L (0.74) | 64 | 106 | 76 | 0 |
| 74 | M (0.75) | 78 | 112 | 85 | 1 |
| 75 | N (0.77) | 52 | 103 | 64 | 0 |
| 76 | O (0.77) | 61 | 78 | 144 | 3 |
| 77 | P (0.77) | 55 | 98 | 96 | 0 |
| 78 | Q (0.95) | 69 | 97 | 105 | 0 |
| 79 | R (0.97) | 66 | 94 | 98 | 0 |
| 80 | S (1.05) | 48 | 90 | 137 | 1 |
| 81 | T (1.08) | 41 | 86 | 86 | 0 |

All publications and patents mentioned in this specification are indicative of the level of ordinary skill in the art to which this invention pertains. All publications and patent applications are herein incorporated by reference to the same extent as if each individual publication or patent was specifically and individually indicated to be incorporated by reference.

It will be apparent to one of ordinary skill in the art that many changes and modifications can be made in the invention without departing from the spirit or scope of the appended claims.

What is claimed is:

1. A method of preparing an ambient temperature-curing emulsion coating composition comprising the steps of:
   (a) reacting an isocyanate-terminated polyurethane prepolymer with a mono- or polyketimine compound containing one other functional group bearing a single active hydrogen atom to yield a ketimine-terminated urethane oligomer;
   (b) dispersing the ketimine-terminated urethane oligomer in water comprising sufficient volatile organic acid to convert the ketimine groups into epoxide-reactive primary amine groups and ketone, and to form an acid salt of 25-50% of the amine groups;

(c) removing the ketone in vacuo; and (d) dispersing an amount of an essentially organic solvent-free, water-free polyepoxide in the urethane oligomer dispersion, so that the ratio of total primary amine hydrogen atoms to epoxide groups is about 0.9 to about 2 to yield an ambient temperature-curing, aqueous urethane-epoxy emulsion coating composition, which is essentially free of organic solvent.

2. The method of claim 1 wherein the mono- or polyketimine compound is formed by the reaction of a monoketone of the formula O=C(R')(R''), wherein R' and R'' together contain about 2-24 carbon atoms and are individually alkyl, cycloalkyl, alkenyl, cycloalkenyl or together are alkylene or alkylidene; with the primary amine groups of N-(aminoethyl)piperazine, N-methyl-1,3-propanediamine or diethylene triamine.

3. The method of claim 1 wherein the isocyanate-terminated polyurethane prepolymer is prepared by reacting an organic polyisocyanate having at least two isocyanate groups with a polyol having at least two hydroxyls and a molecular weight of about 200-7500, so that the ratio of isocyanate:hydroxy is about 1.01-2.0.

4. The method of claim 3 wherein the isocyanate-terminated polyurethane prepolymer has an isocyanate equivalent weight of about 250-5000.

5. The method of claim 1 wherein the polyepoxide is a polyglycidyl ether of a polyphenol, a polyglycidyl ether of a mononuclear polyhydric phenol or a polyglycidyl ether of a polyhydric alcohol containing 2-4 hydroxyl groups.

6. The method of claim 1 wherein, in step (d), the ratio of amine hydrogen atoms to epoxide groups is about 1.25-1.75.

7. An ambient temperature-curing aqueous urethane-epoxy emulsion coating composition comprising an essentially organic solvent-free emulsion in water of:

(a) a urethane oligomer, terminated with primary amine functional groups which are reactive with epoxides, said oligomer being the reaction product of an isocyanate-terminated polyurethane prepolymer and a mono- or polyketimine compound containing one other functional group bearing a single active hydrogen atom which reacts with the isocyanate groups to yield a ketimine-terminated urethane oligomer, and said ketimine-terminated urethane oligomer being emulsified into the water by conversion of the ketimine groups into primary amine groups and formation of the acid salt of 25-50% of the amine groups by a volatile organic acid; and (b) an essentially organic solvent-free, water-free polyepoxide in an amount sufficient to provide a ratio of total primary amine group hydrogen atoms to epoxide groups of about 0.9 to 2.

8. The coating composition of claim 7 wherein the mono- or polyketimine compound is formed by the reaction of a monoketone of the formula O=C(R')(R''), wherein R' and R'' together contain about 2-24 carbon atoms, and are individually alkyl, cycloalkyl, alkenyl, cycloalkenyl or together are alkylene or alkylidene; with the primary amine groups of N-(aminoethyl)piperazine, N-methyl-1,3-propanediamine or diethylenetriamine.

9. The coating composition of claim 7 wherein the isocyanate-terminated polyurethane is prepared by reacting an organic polyisocyanate having at least two isocyanate groups with a polyol having at least two hydroxyls and a molecular weight of about 200-7500, so that the ratio of isocyanate:hydroxyl is about 1.01-2.0.

10. The coating composition of claim 9 wherein the isocyanate-terminated polyurethane prepolymer has an isocyanate equivalent weight of about 250-5000.

11. The coating composition of claim 7 wherein the polyepoxide is a polyglycidyl ether of a polyphenol, a polyglycidyl ether of a mononuclear polyhydric phenol or a polyglycidyl ether of a polyhydric alcohol containing 2-4 hydroxyl groups.

12. The coating composition of claim 7, wherein, in step (b), the ratio of primary amine group hydrogen atoms to epoxide groups is about 1.25-1.75.

13. The ambient temperature-curing emulsion coating composition formed by the method of claim 1.

14. A method of applying a protective coating to a substrate comprising applying a film of the aqueous emulsion coating composition of claim 7 to the substrate, and allowing the film to cure on the substrate.

15. The method of claim 1 wherein, in sep (b), an acid salt of 25-47% of the amine groups is formed.

16. The coating composition of claim 7 wherein the acid salt of 25-47% of the amine groups is formed.

* * * * *

UNITED STATES PATENT AND TRADEMARK OFFICE
CERTIFICATE OF CORRECTION

PATENT NO. : 5,227,414          Page 1 of 3
DATED      : July 13, 1993
INVENTOR(S): G. Dale Ernst et al.

It is certified that error appears in the above-identified patent and that said Letters Patent is hereby corrected as shown below:

Column 9, line 12, "sait" should read --salt--.

Column 10, line 52, "epchlorohydrin" should read --epichlorohydrin--.

Column 12, line 37, "he" should read --the--.

Columns 13-14, lines 47, 48, 49, 50, in Table 1, columns 4, 5, 6 and 7 are incorrectly aligned. Table 1 now reads:

TABLE 1

| Polyurethane Prepolymer ID | Type of Polyol (g) | | TMP g | Type of Isocyanate (g) | | NCO Equivalent Weight of Prepolymer |
|---|---|---|---|---|---|---|
| Prepoly A | PTMG II | (170.3) | 22.33 | IPDI | (129.5) | 965 |
| Prepoly B | Cap | (81.9) | 0.00 | Isocyan I | (139.3) | 1100 |
| Prepoly C | PNPA I + | (167.5) | 178.64 | IPDI | (971.3) | 1820 |
|  | PNPA II | (789.9) |  | MDI | (126.6) | 1870 |
| Prepoly D | PNPA I | (93.1) | 11.17 | TDI | (304.5) | 1890 |
| Prepoly E | PTMG II | (505) | 66.99 | IPDI | (388.5) | 1930 |
| Prepoly F | PTMG I | (318) | 66.99 | IPDI | (194.3) | 2440 |
| Prepoly G | Cap | (235.5) | 31.26 | $H_{12}MDI$ | (102.7) | 3400 |
| Prepoly H | PNPA II | (122.5) | 13.89 | Isocyan II + | (79.3) | 4510 |
| Prepoly I | PNPA II | (179.0) | 0.00 | IPDI | (15.9) |  |
| Prepoly J | PNPA II + | (138.4) | 6.70 | IPDI | (97.1) | 5150 |
|  | PU | (56.1) |  |  |  |  |

Cap = Polycaprolactone diol, OH# = 143
PNPA I = Poly(neopentyl adipate) diol, OH# = 225
PNPA II = Poly(neopentyl adipate) diol, OH# = 112
PTMG I = Polytetramethylene glycol, OH# = 173
PTMG II = Polytetramethylene glycol, OH# = 112
PU = Polyurethane diol, OH# = 320
IPDI = Isophorone diisocyanate
Isocyan I = Isocyanurate of 1,6-hexamethylene diisocyanate
Isocyan II = Isocyanurate of isophorone diisocyanate
MDI = 4,4'-Bis(isocyanatophenyl)methane
TDI = Toluene diisocyanate
$H_{12}MDI$ = Bis-(4-isocyanatocyclohexyl)methane

UNITED STATES PATENT AND TRADEMARK OFFICE
CERTIFICATE OF CORRECTION

PATENT NO. : 5,227,414      Page 2 of 3
DATED : July 13, 1993
INVENTOR(S) : G. Dale Ernst et al.

It is certified that error appears in the above-identified patent and that said Letters Patent is hereby corrected as shown below:

Table 1 should read:

TABLE 1

| Polyurethane Prepolymer ID | Type of Polyol (g) | | TMP g | Type of Isocyanate (g) | | NCO Equivalent Weight of Prepolymer |
|---|---|---|---|---|---|---|
| Prepoly A | PTMG II | (170.3) | 22.33 | IPDI | (129.5) | 965 |
| Prepoly B | Cap | (81.9) | 0.00 | Isocyan I | (139.3) | 1100 |
| Prepoly C | PNPA I | (167.5) | | | | |
|  | +PNPA II | (789.9) | 178.64 | IPDI | (971.3) | 1820 |
| Prepoly D | PNPA I | (93.1) | 11.17 | MDI | (126.6) | 1870 |
| Prepoly E | PTMG II | (505) | 66.99 | TDI | (304.5) | 1890 |
| Prepoly F | PTMG I | (318) | 66.99 | IPDI | (388.5) | 1930 |
| Prepoly G | Cap | (235.5) | 31.26 | IPDI | (194.3) | 2440 |
| Prepoly H | PNPA II | (122.5) | 13.89 | $H_{12}MDI$ | (102.7) | 3400 |
| Prepoly I | PNPA II | (179.0) | 0.00 | Isocyan II | (79.3) | |
|  |  |  |  | + IPDI | (15.9) | 4510 |
| Prepoly J | PNPA II | (138.4) | | | | |
|  | + PU | (56.1) | 6.70 | IPDI | (97.1) | 5150 |

UNITED STATES PATENT AND TRADEMARK OFFICE
CERTIFICATE OF CORRECTION

PATENT NO. : 5,227,414

DATED : July 13, 1993

INVENTOR(S) : G. Dale Ernst et al.

It is certified that error appears in the above-identified patent and that said Letters Patent is hereby corrected as shown below:

Column 13, line 65, "Formation" should read --Formulation--.

Column 20, line 49, "patent applications" should read --patents--.

Column 22, line 44, "sep" should read --step--.

Signed and Sealed this

Twelfth Day of April, 1994

*Attest:*

BRUCE LEHMAN

*Attesting Officer*      *Commissioner of Patents and Trademarks*